US009846187B2

(12) United States Patent
Teper

(10) Patent No.: US 9,846,187 B2
(45) Date of Patent: Dec. 19, 2017

(54) SNOOPING DETECTION BETWEEN SILICON ELEMENTS IN A CIRCUIT

(71) Applicant: WINBOND ELECTRONICS CORPORATION, Taichung (TW)

(72) Inventor: Valery Teper, Petah-Tikwa (IL)

(73) Assignee: WINBOND ELECTRONICS CORPORATION, Taichung (TW)

(*) Notice: Subject to any disclaimer, the term of this patent is extended or adjusted under 35 U.S.C. 154(b) by 83 days.

(21) Appl. No.: 14/708,315

(22) Filed: May 11, 2015

(65) Prior Publication Data
US 2016/0334449 A1    Nov. 17, 2016

(51) Int. Cl.
G01R 27/26    (2006.01)
G06F 21/55    (2013.01)
G06F 21/75    (2013.01)
G06F 21/85    (2013.01)
H01L 23/00    (2006.01)
H04L 9/10     (2006.01)

(52) U.S. Cl.
CPC ....... G01R 27/2605 (2013.01); G06F 21/558 (2013.01); G06F 21/75 (2013.01); G06F 21/85 (2013.01); H01L 23/576 (2013.01); H04L 9/10 (2013.01); H04L 2209/122 (2013.01)

(58) Field of Classification Search
CPC ..... G01R 63/102; G01R 27/2605; H04L 9/10; G06F 21/558; G06F 21/75; G06F 21/85; H01L 23/576
See application file for complete search history.

(56) References Cited

U.S. PATENT DOCUMENTS

| 7,884,625 B2 | 2/2011 | Bartley et al. |
| 2001/0003540 A1* | 6/2001 | Pomet ................ H04L 9/00 380/260 |
| 2009/0105975 A1* | 4/2009 | Weber ............... G01R 27/2605 702/65 |
| 2011/0285421 A1* | 11/2011 | Deas ................... H04L 7/0337 326/8 |
| 2014/0230553 A1* | 8/2014 | Vokey ................. G01P 13/00 73/579 |
| 2014/0240283 A1* | 8/2014 | Paulsen ................ G06F 21/83 345/174 |
| 2014/0253032 A1* | 9/2014 | Bruwer ................ H02M 1/36 320/108 |
| 2014/0320151 A1 | 10/2014 | Filippi et al. |
| 2015/0109002 A1 | 4/2015 | Dichtl |

FOREIGN PATENT DOCUMENTS

EP    1721231    12/2009

* cited by examiner

Primary Examiner — Kambiz Zand
Assistant Examiner — Tongoc Tran
(74) Attorney, Agent, or Firm — Soroker Agmon Nordman

(57) ABSTRACT

An electronic circuit with protection against eavesdropping, including a first circuit element embedded in the electronic circuit, a second circuit element embedded in the electronic circuit, one or more connection lines between the first circuit element and the second circuit element, a first monitoring unit in the first circuit element for measuring capacitance of at least one of the connection lines between the first circuit element and the second circuit element, wherein the first monitoring unit is configured to identify changes in capacitance of the connection lines and to initiate actions to prevent eavesdropping in response to identifying changes.

19 Claims, 4 Drawing Sheets

SNOOPING DETECTION BETWEEN SILICON ELEMENTS IN A CIRCUIT

TECHNICAL FIELD

The present invention relates to the detection and prevention of eavesdropping to connections between silicon elements in electrical circuits.

BACKGROUND

In secure applications performed by electronic circuits it is common to provide output data in an encrypted form to hinder the ability of a rival eavesdropper from collecting the data in an easily usable form. Additionally secure electronic circuits may be robustly packaged so that the rival eavesdropper cannot readily access the silicon elements of the circuit and attach snooping equipment to the inputs and/or outputs of the silicon elements that compose the circuit.

If the rival eavesdropper has physical access and enough time he may be able to uncover internal connections of the circuit and access data before it is encrypted for output. Optionally, the snooping equipment may be attached in parallel to a connection or may be inserted in series with the other elements of the circuit.

To overcome this problem in some circuits the silicon elements encrypt data exiting from the element so that the rival eavesdropper will not be able to collect unencrypted data from connections within the electronic circuit even when gaining access to the outputs of elements.

In any case transmitting data in an encrypted form between circuit elements has a price. Each element needs to have a built in encryption circuit and/or an un-encryption circuit embedded therein to support such an option.

SUMMARY

An aspect of an embodiment of the disclosure relates to an electronic circuit with two or more circuit elements connected by one or more connection lines. At least one of the circuit elements includes a monitoring unit for measuring capacitance, resistance and/or inductance of at least one of the connection lines. The monitoring unit identifies changes in the capacitance, resistance and/or inductance of the measured connection line and responsive to the changes takes actions to prevent eavesdropping from the connection line.

In an exemplary embodiment of the disclosure, the monitoring unit can select which line to monitor and may alternately monitor different connection lines. Optionally, the circuit element on the other end of the connection line also includes a monitoring unit. In some embodiments of the disclosure, both monitoring units participate in checking a connection line. Optionally, other connection lines are used to coordinate between the monitoring units to perform the checking. In some embodiments of the disclosure, information passed from one circuit element to another may be encrypted to prevent an eavesdropper from readily reviewing information sent from one circuit element to another to coordinate checking of a connection line.

In some embodiments of the disclosure, the connection line is checked by providing current from a monitoring unit of a circuit element. Optionally, the current may be provided according to a current function (in contrast to a fixed current) and the voltage monitored as a function of time to determine if the capacitance of the line is as expected or if there is a change in the capacitance. In an exemplary embodiment of the disclosure, the current function may be selected randomly each time the connection line is checked so that an eavesdropper cannot predict the change in current as a function of time.

There is thus provided according to an exemplary embodiment of the disclosure, an electronic circuit with protection against eavesdropping, comprising:

A first circuit element embedded in the electronic circuit;
A second circuit element embedded in the electronic circuit;
One or more connection lines between the first circuit element and the second circuit element;
A first monitoring unit in the first circuit element for measuring capacitance of at least one of the connection lines between the first circuit element and the second circuit element; Wherein the first monitoring unit is configured to identify changes in capacitance of the connection lines and to initiate actions to prevent eavesdropping in response to identifying changes.

In an exemplary embodiment of the disclosure, the second circuit element includes a second monitoring unit. Optionally, the first monitoring unit and the second monitoring unit measure capacitance of a selected connection line at different times. In an exemplary embodiment of the disclosure, the first monitoring unit and the second monitoring unit measure capacitance of a selected connection line together at the same time. Optionally, the first circuit element provides synchronization information to the second circuit element over the connection lines to synchronize measuring capacitance by the first monitoring unit and the second monitoring unit together. In an exemplary embodiment of the disclosure, the first monitoring unit and the second monitoring unit compare the timing of a measured voltage signal to detect a discrepancy in the timing of the signal. Optionally, the first monitoring unit and the second monitoring unit provide current synchronously to a connection line to determine its capacitance.

In an exemplary embodiment of the disclosure, the first monitoring unit is configured to select and measure capacitance of more than one connection line. Optionally, the first monitoring unit is configured to measure also resistance and/or induction. In an exemplary embodiment of the disclosure, the first monitoring unit provides current to a connection line to measure capacitance of the connection line. Optionally, the first monitoring unit randomly selects from two or more current functions for defining the provision of current to a connection line over time to measure capacitance of the connection line. In an exemplary embodiment of the disclosure, upon identifying changes in capacitance above a pre-selected threshold value the first circuit element halts activity of the first circuit element. Alternatively, upon identifying changes in capacitance above a pre-selected threshold value the first circuit element provides erroneous data at outputs of the first circuit element. In an exemplary embodiment of the disclosure, the first circuit element communicates with the second circuit element with encrypted data over the connection lines. Optionally, the first monitoring unit monitors voltage of a connection line while providing current according to a current function and verifies that the monitored voltage fits an expected voltage function. In an exemplary embodiment of the disclosure, the first circuit element initiates a capacitance test of a connection line before transmitting data to the second circuit element over the connection line.

There is further provided according to an exemplary embodiment of the disclosure, a method of protecting an electronic circuit against eavesdropping, comprising:

Providing an electronic circuit with a first circuit element embedded therein and a second circuit element embedded therein with one or more connection lines between them;

Installing a first monitoring unit in the first circuit element for measuring capacitance of at least one of the connection lines;

Measuring capacitance of the at least one connection line between the first circuit element and the second circuit element;

Identifying changes in the capacitance of the at least one connection line;

Initiating actions to prevent eavesdropping responsive to the identifying.

In an exemplary embodiment of the disclosure, the method comprises installing a second monitoring unit in the second circuit element. Optionally, the method comprises measuring resistance and/or induction of the at least one connection line. In an exemplary embodiment of the disclosure, the first monitoring unit monitors voltage of a connection line while providing current according to a current function and verifies that the monitored voltage fits an expected voltage function.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear. It should be noted that the elements or parts in the figures are not necessarily shown to scale such that each element or part may be larger or smaller than actually shown.

DETAILED DESCRIPTION

Figure 1:
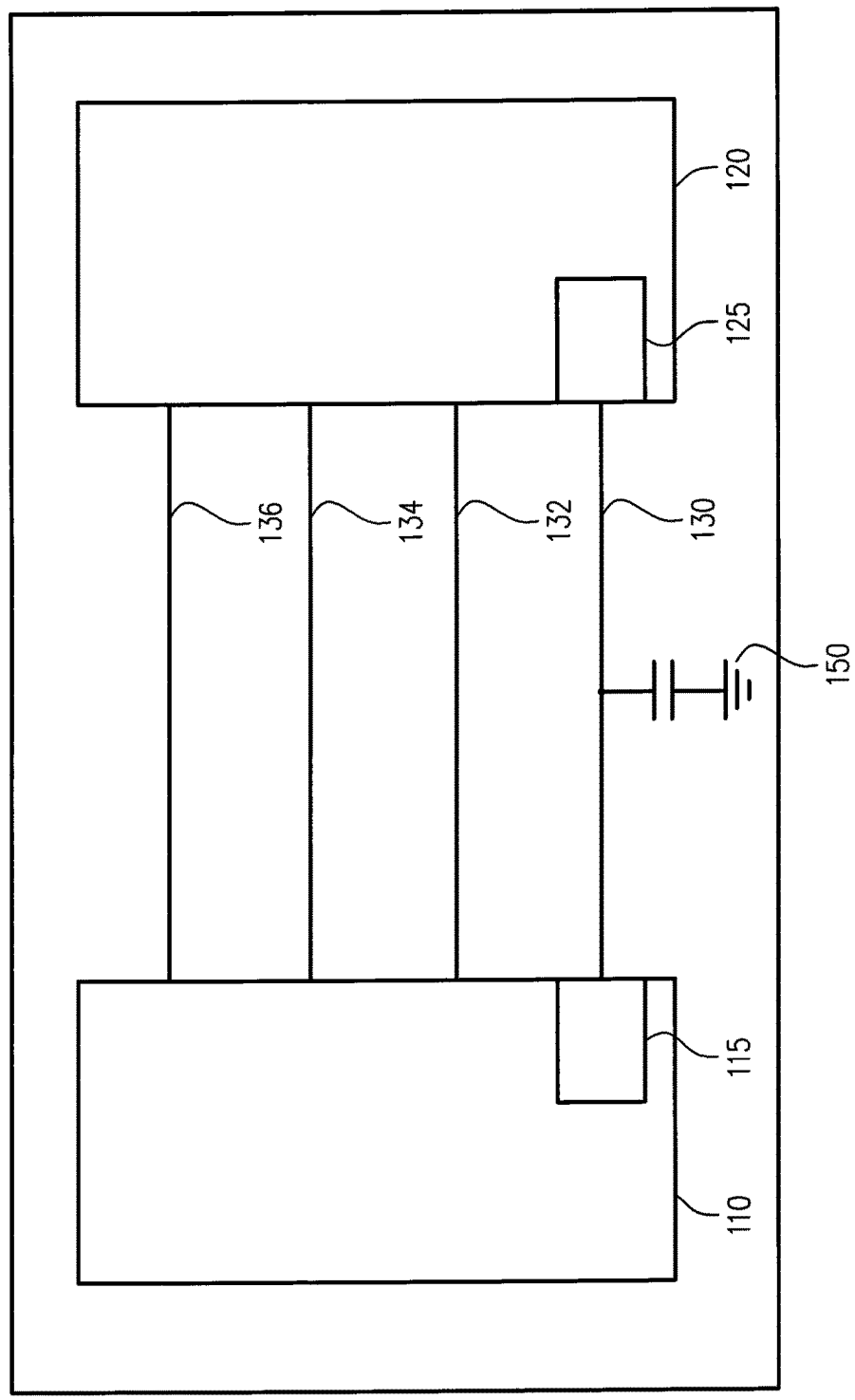
FIG. 1 is a schematic illustration of an electronic circuit with two silicon circuit elements with a data connection between them, according to an exemplary embodiment of the disclosure.

FIG. 1 is a schematic illustration of an electronic circuit 100 with two silicon circuit elements (110, 120) with a data connection line 130 between them, according to an exemplary embodiment of the disclosure. In an exemplary embodiment of the disclosure, the circuit elements (110, 120) are connected with multiple connection lines (e.g. 130, 132, 134, and 136) each line having an inherent capacitance 150. Some of the connection lines 130 may be monitored and some may not be monitored. Optionally, silicon circuit element 110 includes a monitoring circuit 115 that can measure the capacitance 150 of a connection line, for example connection line 130, 132, 134, 136. In some embodiments of the disclosure, silicon circuit element 120, which is connected to silicon circuit element 110 via connection line 130, may also include a monitoring circuit 125 to cooperate with the measuring process of monitoring circuit 115 or each monitoring circuit (115, 125) may act independently. Optionally, monitoring circuit 115 and/or monitoring circuit 125 may act on any one of the connection lines (130, 132, 134, 136) or they may be dedicated to a specific connection line (e.g. 130).

In an exemplary embodiment of the disclosure, silicon circuit element 110 may initiate a capacitance test by monitoring circuit 115 periodically or in response to an event (e.g. before sending data to silicon circuit element 120). Optionally, other connection lines (e.g. 132, 134, 136) may be used to synchronize capacitance monitoring between monitoring circuit 115 and monitoring circuit 125, for example by sending a signal or message to notify the other side to start the monitoring process. Optionally, the message is encrypted so that an eavesdropper will not know when the test is to be performed.

In an exemplary embodiment of the disclosure, circuit element 110 and/or circuit element 120 are programmed to identify a capacitance change e.g. in communication line 130 beyond a threshold value, thus identifying that someone has tampered with a connection line between the circuit elements (110, 120). Optionally, in response to identifying a tampering event the circuit element may be halted, deactivated, provide erroneous data and/or send a notification signal or message to an administrator.

Figure 2A:
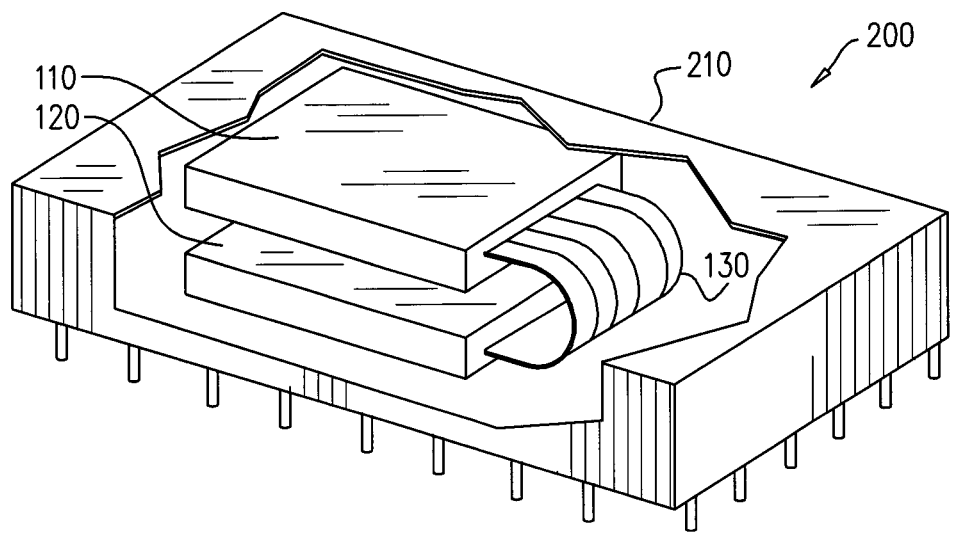
FIG. 2A is a schematic illustration of an integrated circuit with multiple silicon circuit elements, according to an exemplary embodiment of the disclosure.
Figure 2B:
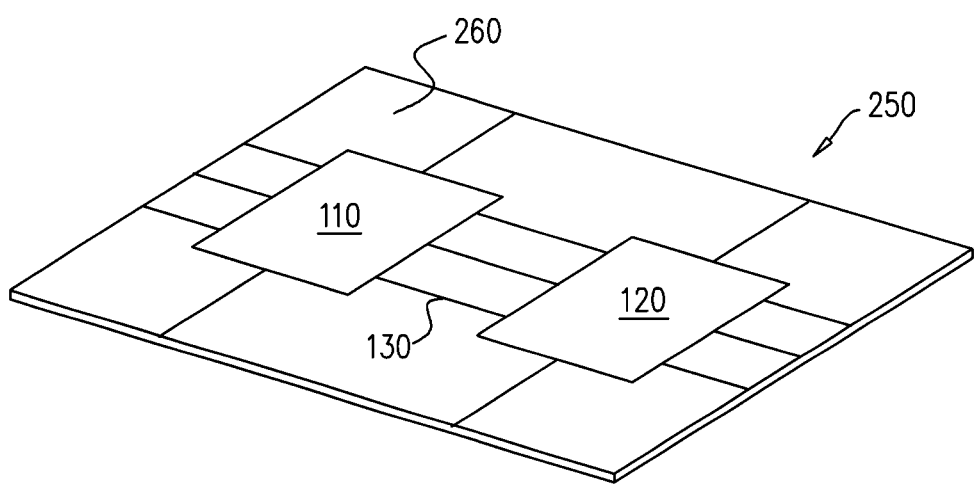
FIG. 2B is a schematic illustration of a circuit board with multiple silicon circuit elements, according to an exemplary embodiment of the disclosure.

In some embodiments of the disclosure, the circuit elements (110, 120) may be packaged as an integrated circuit 200 (chip) with a common ceramic or plastic packaging 210, for example as illustrated in FIG. 2A. Alternatively, the circuit elements 110, 120 may be elements on a common PCB 260. for example as illustrated in FIG. 2B. Further alternatively, the circuit elements (110, 120) may be provided on multiple PCBs.

Figure 3A:
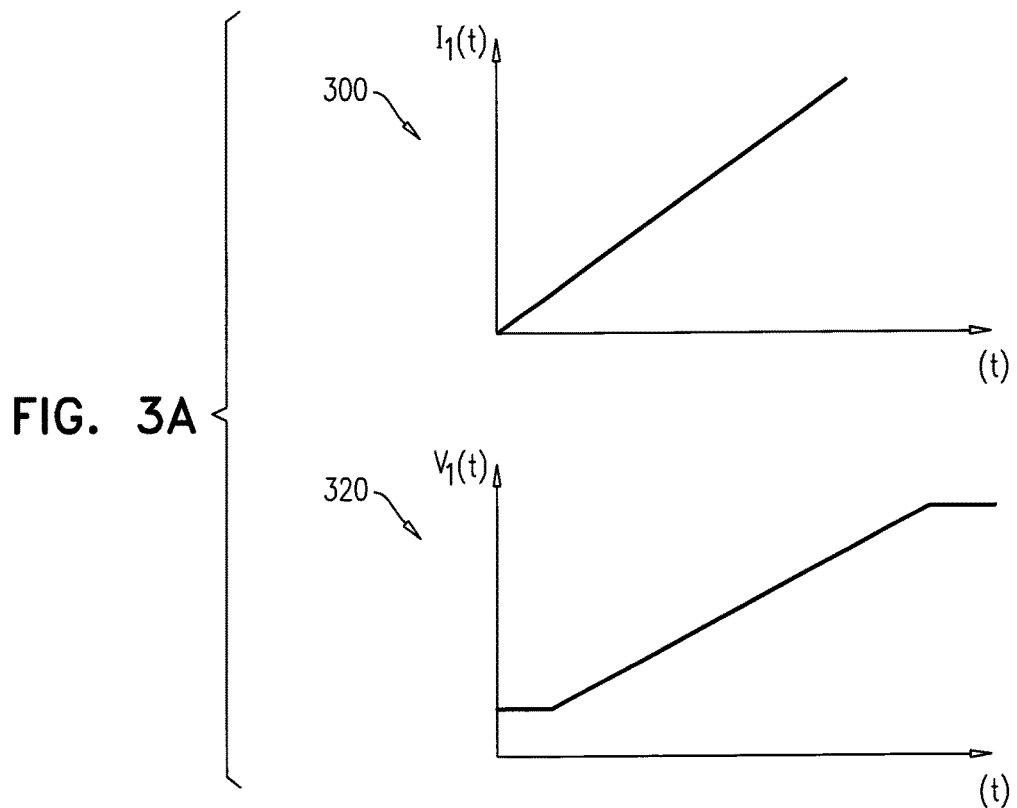
FIG. 3A is a schematic illustration of a first current signal and a first voltage signal, according to an exemplary embodiment of the disclosure.

In an exemplary embodiment of the disclosure, capacitance 150 is measured by providing a current 300 from monitoring circuit 115 over connection line 130 as illustrated in FIG. 3A. Optionally, while providing the current 300 monitoring circuit 115 evaluates the voltage 320 of connection line 130 as a function of time. By determining a quantity of charge required to reach a constant voltage one can determine the capacitance 150 of connection line 130.

Figure 3B:
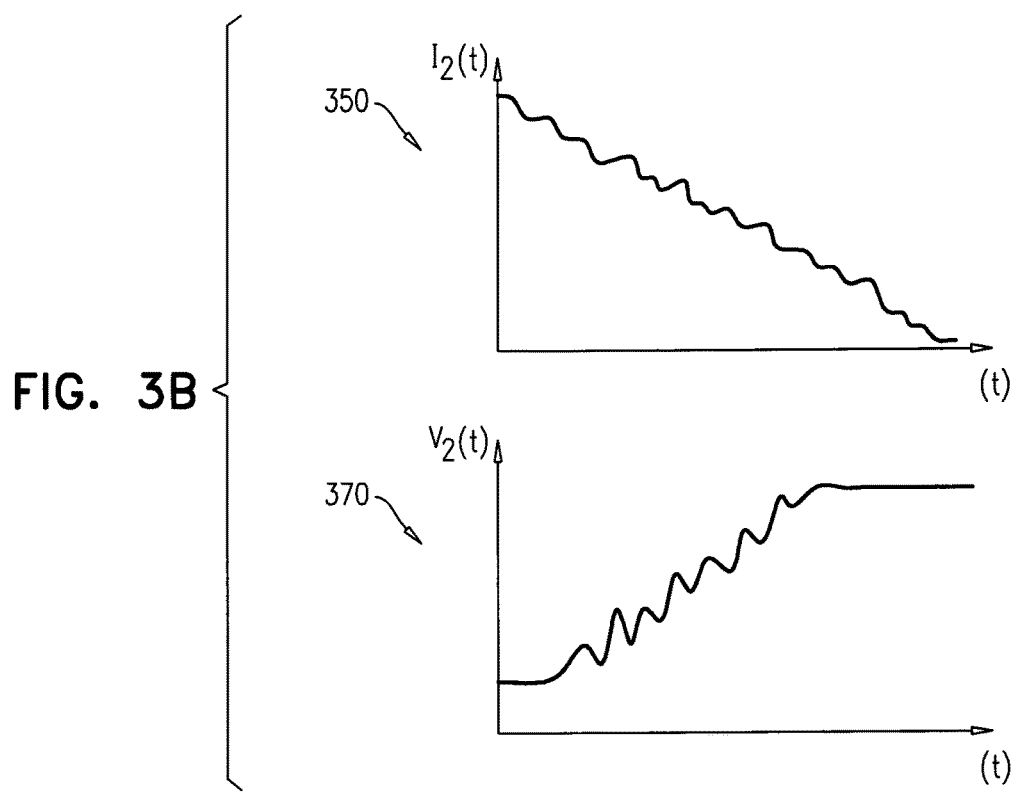
FIG. 3B is a schematic illustration of an alternative current signal and an alternative voltage, according to an exemplary embodiment of the disclosure.

In some embodiments of the disclosure, the eavesdropper may be aware that the capacitance 150 is monitored at specific times or after specific events, for example responsive to notifications on other connection lines (e.g. 132, 134). The eavesdropper may be aware of the current function used to measure the capacitance. Optionally, when connected the eavesdropper may detect that monitoring circuit 115 is measuring the capacitance and provide current to compensate for the increase in capacitance caused by the eavesdropper connection, so that monitoring circuit 115 will not detect the eavesdropping connection. To overcome this problem monitoring circuit 115 may check with different current functions at different times, for example as illustrated in FIG. 3B (current 350 and voltage 370). Optionally, monitoring circuit 115 may randomly select to provide current according to the function defined by current 300, current 350 or other current functions so that the eavesdropper cannot predict which current function is to be used and compensate the current in real time to provide a correct voltage function (320, 370).

In some embodiments of the disclosure, monitoring circuit 115 and monitoring circuit 125 (from both sides of connection line 130) may both measure capacitance of connection line 130 at different times, simultaneously or together synchronously to prevent an eavesdropper from attaching itself in series into connection line 130 and responding to each side independently or to transfer signals from side to side, without one side being aware of a discrepancy in the timing of the signals from the other side. Optionally, monitoring circuit 115 and monitoring circuit 125 may synchronously check connection line 130 together with a specific current function. In an exemplary embodiment of the disclosure, two connection lines may be used, for example to synchronize between the sides with one connection line (e.g. 132) while checking the other connection line (e.g. 130). Optionally, one side may provide current while the other side only measures the voltage or both sides may provide current in synch.

Figure 4:
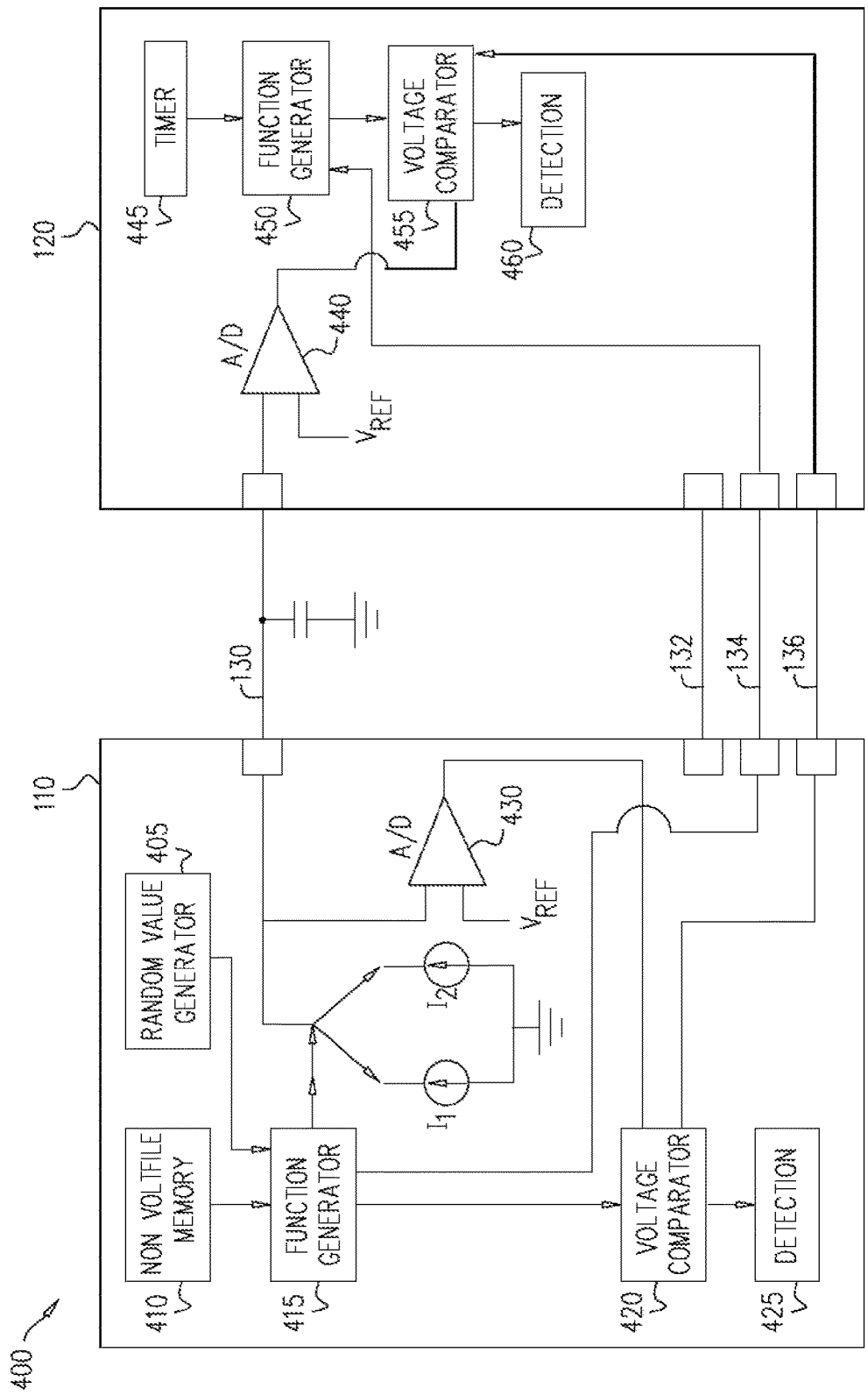
FIG. 4 is a schematic illustration of a circuit for implementing a silicon protection scheme, according to an exemplary embodiment of the disclosure.

FIG. 4 is a schematic illustration of a circuit 400 for implementing a silicon protection scheme, according to an exemplary embodiment of the disclosure. Circuit 400 includes silicon elements 110 and 120 that are connected by wires 130, 132, 134, 136. Optionally, wire 130 is monitored by providing current from current source I1 or current source I2 to connection line 130. In an exemplary embodiment of the disclosure, the current provided to connection line 130 is selected from current source I1 or current source I2 and/or controlled by a function generator 415 (e.g. to define the current flow as a function of time). Optionally, the function used at a specific moment is selected and/or generated based on a random value provided by a random value generator 405. In some embodiments of the disclosure, a non-volatile memory 410 stores function definitions from which function generator 415 generates a function according to which the current is provided to the monitored connection line 130. In an exemplary embodiment of the disclosure, an Analog to Digital Converter 430 is used to sample the voltage on connection line 130 and forward information of the sampled voltage to a voltage comparator 420. The voltage comparator 420 compares the sampled voltage as a function of time with a predicted voltage based on the function generated by function generator 415. Optionally, voltage comparator 420 notifies a detection handling unit 425 that determines if security has been compromised and provides instructions in response to the determination, for example halting circuit element 110 or causing circuit element 110 to provide erroneous output values to fool the eavesdropper.

In an exemplary embodiment of the disclosure, the second silicon circuit element 120 also includes an Analog to Digital Converter 440 to sample the voltage of connection line 130. Optionally, the measurements are provided to a voltage comparator 455 and compared with the voltage from circuit element 110 that is represented by a signal transmitted over one of the connection lines (e.g. 136). In an exemplary embodiment of the disclosure, the results of the comparison are provided to a detection handling unit 460 that controls circuit element 120 responsive to the results. Alternatively or additionally, circuit element 120 includes a function generator 450 that generates an expected voltage signal based on information provided over one of the connection lines (e.g. 134) from circuit element 110 (e.g. from function generator 415). Optionally, function generator 450 is provided with details of the expected function and timing information so that circuit element 120 can measure the input voltage in sync with circuit element 110. In some embodiments of the disclosure, circuit element 120 includes a timer 445 to remain synchronized with circuit element 110. Alternatively or additionally, synchronization information is provided over the connection lines (e.g. connection line 136). Optionally, the information transmitted between circuit element 110 and circuit element 120 is encrypted to prevent eavesdropping and immediately responding to the information, for example to overcome protective actions taken by the circuit elements (110, 120).

In an exemplary embodiment of the disclosure, the above methods may be applied to measure resistance or induction instead or in addition to the capacitance measurements, for example circuit element 110 may measure capacitance and resistance to enhance accuracy in detecting eavesdroppers.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

I claim:

1. An electronic circuit with protection against eavesdropping, comprising:
a random value generator providing a random value for randomly selecting one of a plurality of current functions;
a first circuit element embedded in the electronic circuit;
a second circuit element embedded in the electronic circuit;
a first connection line between the first circuit element and the second circuit element;
a first monitoring unit in the first circuit element applying a first current to the first connection line according to the randomly selected one of the plurality of current functions for measuring capacitance of the first connection line between the first circuit element and the second circuit element;
wherein the first monitoring unit is configured to determine whether the measured capacitance of the first connection line is as expected according to the randomly selected one of the plurality of current functions or not and to initiate actions to prevent eavesdropping when the measured capacitance is not the expected one.

2. An electronic circuit according to claim 1, wherein the second circuit element includes a second monitoring unit.

3. An electronic circuit according to claim 2, wherein the first monitoring unit and the second monitoring unit measure the capacitance of the first connection line at different times.

4. An electronic circuit according to claim 2, wherein the first monitoring unit and the second monitoring unit measure the capacitance the first connection line together at the same time.

5. An electronic circuit according to claim 2, wherein the first circuit element provides synchronization information to the second circuit element over the first connection line to synchronize measuring the capacitance by the first monitoring unit and the second monitoring unit together.

6. An electronic circuit according to claim 2, wherein the first monitoring unit and the second monitoring unit compare the timing of a measured voltage signal to detect a discrepancy in the timing of the signal.

7. An electronic circuit according to claim 2, wherein the first monitoring unit and the second monitoring unit provide the first current synchronously to the first connection line to determine the capacitance of the first connection line.

8. An electronic circuit according to claim 1, wherein the first monitoring unit is configured to provide a second current according to another randomly selected one of the plurality of current functions to a second connection line coupled between the first and second circuit elements to measure capacitance of the second connection line.

9. An electronic circuit according to claim 1, wherein the first monitoring unit is configured to measure also resistance and/or induction of a third connection line coupled between the first and second circuit elements.

10. An electronic circuit according to claim 8, wherein the first monitoring unit is configured to measure also resistance and/or induction of a third connection line coupled between the first and second circuit elements.

11. An electronic circuit according to claim 1, wherein upon difference between the measured capacitance and the expected capacitance above a pre-selected threshold value the first circuit element halts activity of the first circuit element.

12. An electronic circuit according to claim 1, wherein upon difference between the measured capacitance and the expected capacitance above a pre-selected threshold value the first circuit element provides erroneous data, at outputs of the first circuit element.

13. An electronic circuit according to claim 1, wherein the first circuit element communicates with the second circuit element with encrypted data over the first connection line.

14. An electronic circuit according to claim 1, wherein the first monitoring unit monitors voltage of a second connection line coupled between the first and second circuit elements while providing the first current and verifies that the monitored voltage fits an expected voltage function.

15. An electronic circuit according to claim 1, wherein the first circuit element initiates a capacitance test of the first connection line before transmitting data to the second circuit element over the first connection line.

16. A method of protecting an electronic circuit against eavesdropping, comprising:
providing an electronic circuit with a first circuit element embedded therein and a second circuit element embedded therein with a first connection line between them;
installing a first monitoring unit in the first circuit element for measuring capacitance of the first connection line;
randomly selecting one current function of a plurality of current functions according to a random value generated by a random value generator;
providing a first current to the first connection line according to the randomly selected one current function to measure the capacitance of the at first connection line between the first circuit element and the second circuit element;
determining whether the measured capacitance of the first connection line is as expected according to the randomly selected one of the plurality of current functions or not; and,
initiating actions to prevent eavesdropping when the measured capacitance is not the expected one.

17. A method according to claim 16, further comprising installing a second monitoring unit in the second circuit element to measure the capacitance of the first connection line or capacitance of a second connection line coupled between the first and second circuit elements.

18. A method according to claim 17, further comprising:
measuring resistance and/or induction of the second connection line;
identifying changes in the resistance and/or induction of the second connection line; and,
initiating the actions to prevent eavesdropping when the changes in the resistance and/or induction of the second connection line is beyond a threshold value.

19. A method according to claim 17, further comprising:
monitoring voltage of the second connection line while providing the first current to the first connection line; and,
verifying that the monitored voltage fits an expected voltage function.

* * * * *